United States Patent [19]

McHorse et al.

[11] Patent Number: 5,788,321
[45] Date of Patent: Aug. 4, 1998

[54] REMOVABLE SIDE FAIRING FOR A VEHICLE

[75] Inventors: James Vincent McHorse, Portland; Thomas A. Leslie, Tigard, both of Oreg.

[73] Assignee: Freightliner Corporation, Portland, Oreg.

[21] Appl. No.: 650,115

[22] Filed: May 22, 1996

[51] Int. Cl.$^6$ ..................................................... B60R 3/00
[52] U.S. Cl. ........................ 296/180.1; 296/183; 280/163
[58] Field of Search ............................... 296/180.1, 183, 296/198; 280/163, 164.1

[56] References Cited

U.S. PATENT DOCUMENTS

| | | | |
|---|---|---|---|
| D. 291,872 | 9/1987 | Simons et al. | 296/183 X |
| D. 308,032 | 5/1990 | Kerney et al. | |
| D. 312,805 | 12/1990 | Marlowe et al. | |
| D. 320,583 | 10/1991 | Simons et al. | |
| D. 328,273 | 7/1992 | McGrew, Jr. et al. | |
| D. 367,027 | 2/1996 | Onopa. | |
| 4,836,568 | 6/1989 | Preslik et al. | 296/180.1 X |
| 4,925,235 | 5/1990 | Fingerle | 296/183 X |
| 4,932,716 | 6/1990 | Marlowe et al. | |
| 5,308,134 | 5/1994 | Stanesic. | |

OTHER PUBLICATIONS

Freightliner Business Class brochure (Copyright 1996) (depicting prior art trucks).
Freightliner Heavy–Duty Trucks, FLD 120 Conventional (depicting prior art trucks).
Freightliner Heavy–Duty Trucks, The Classic XL (depicting prior art trucks).
Freightliner Business Class FL 112 Conventional brochure (Copyright 1995).
Copy of undated International (Navistar) brochure depicting 9000 Conventional trucks (prior art trucks).
Copyright of WhiteGMC brochure entitled "WhiteGMC™ Tall Integral Sleeper" (Copyright 1992).
Copy of page from undated Volvo brochure showing a Volvo truck.

*Primary Examiner*—Joseph D. Pape
*Attorney, Agent, or Firm*—Klarquist Sparkman Campbell Leigh & Whinston

[57] ABSTRACT

A vehicle having a side-mounted fairing for reducing aerodynamic drag in which a portion of the fairing is easily removable to allow access to vehicle components is disclosed. The removable fairing includes a convolute sheet of substantially rigid material in which planar surfaces are formed for providing steps. Support rails are mounted to an inner surface of the fairing just below the steps to connect the fairing to the vehicle and to support weight placed on the steps. The rails include mortise and tenon connections for connecting the removable fairing portion to a fixed portion of the fairing. In addition, support brackets are fixedly attached to the vehicle and extend outward to provide support for the removable fairing. Fasteners are provided for securing the removable fairing to the vehicle and to the fixed portion of the fairing.

24 Claims, 7 Drawing Sheets

1

REMOVABLE SIDE FAIRING FOR A VEHICLE

BACKGROUND OF THE INVENTION

1. Field of the Invention

This invention pertains to fairings mounted on the sides of vehicles to reduce aerodynamic drag and particularly, fairings located on heavy-duty trucks.

2. Description of the Related Art

Vehicle designers know that low-aerodynamic drag will improve vehicle fuel efficiency and performance. Accordingly, there is a recent trend to provide side fairings on vehicles to reduce the aerodynamic resistance of the vehicle moving through air. In addition to providing an aerodynamic surface, the fairings must be securely mounted to withstand harsh road conditions, such as high winds, vibrations, shocks and flying debris. However, fairings often make access to components that must be serviced difficult. Accordingly, there is a need for fairings that reduce aerodynamic drag and that can be securely mounted yet easily removed to allow access to vehicle components.

SUMMARY OF THE INVENTION

The present invention provides an easily movable fairing that can be securely mounted in one position along the sides of a vehicle, in particular, vehicles intended for use with heavy equipment, such as the tractor of a tractor-trailer combination and which is movable to a second position wherein it doesn't interfere with access to components located behind the movable side fairing. In the second position, the movable side fairing is most preferably detached from the vehicle. Hence, this movable fairing in one embodiment is removable and thus may be called a removable fairing in this embodiment. Such vehicles may also have fixed fairings at locations where access to vehicle components is not a significant requirement. In the preferred embodiment, such a fixed fairing is located contiguous with the removable fairing. Unless specifically designated as a "fixed" fairing, all references to a fairing in this specification are references to the removable fairing.

Preferably, the removable fairing includes a one-piece, molded convolute sheet of a rigid material, such as fiberglass, plastic or other formable material. The fairing includes reinforcing members or support rails that are located on an inner surface of the fairing. The rails provide a secure attachment of the fairing to the vehicle. Also, by attaching the rails to the fairing, they are removed with the fairing so that access to the undercarriage and frame is facilitated when the fairing is removed. An outer surface of the sheet includes steps which are preferably planar horizontal surfaces. Abrasive tread material may be placed on the planar surfaces to make the steps slip-resistant. Preferably, rails are located below the steps to support weight placed on the steps.

The removable fairing is located on, and supported by, at least one side fairing support or bracket that projects or extends out from a longitudinal rail or beam of the frame of the truck. The fairing may be telescopingly coupled to another support bracket. Thus, the fairing may be further supported by interlocking rails on the removable fairing that connect to rails associated with the contiguous, fixed fairing. At least one fastener detachably connects the removable fairing to the contiguous fairing and to the support bracket. Preferably, the fastener is a latch that includes a flexible strap that attaches to a fixed hook and which can be secured in place by a pin and clip that will prevent the latch from decoupling during shocks and vibration.

The fairing brackets in the region of the removable fairing are preferably spaced-apart to provide access space therebetween through which a user may walk to approach the side rail and vehicle components such as batteries spaced inwardly from the side fairing toward the frame rail. The access space also allows convenient access to the vehicle's undercarriage. Preferably, the access space is bracing free, that is clear of vehicle frame components that interfere with a user approaching the frame rail.

Various advantages and features of novelty which characterize the invention are particularized in the claims forming a part hereof. However, for a better understanding of the invention and its advantages, refer to the drawings and accompanying description which illustrate and describe a preferred embodiment of the invention.

DETAILED DESCRIPTION OF THE PREFERRED EMBODIMENTS

Figure 1:
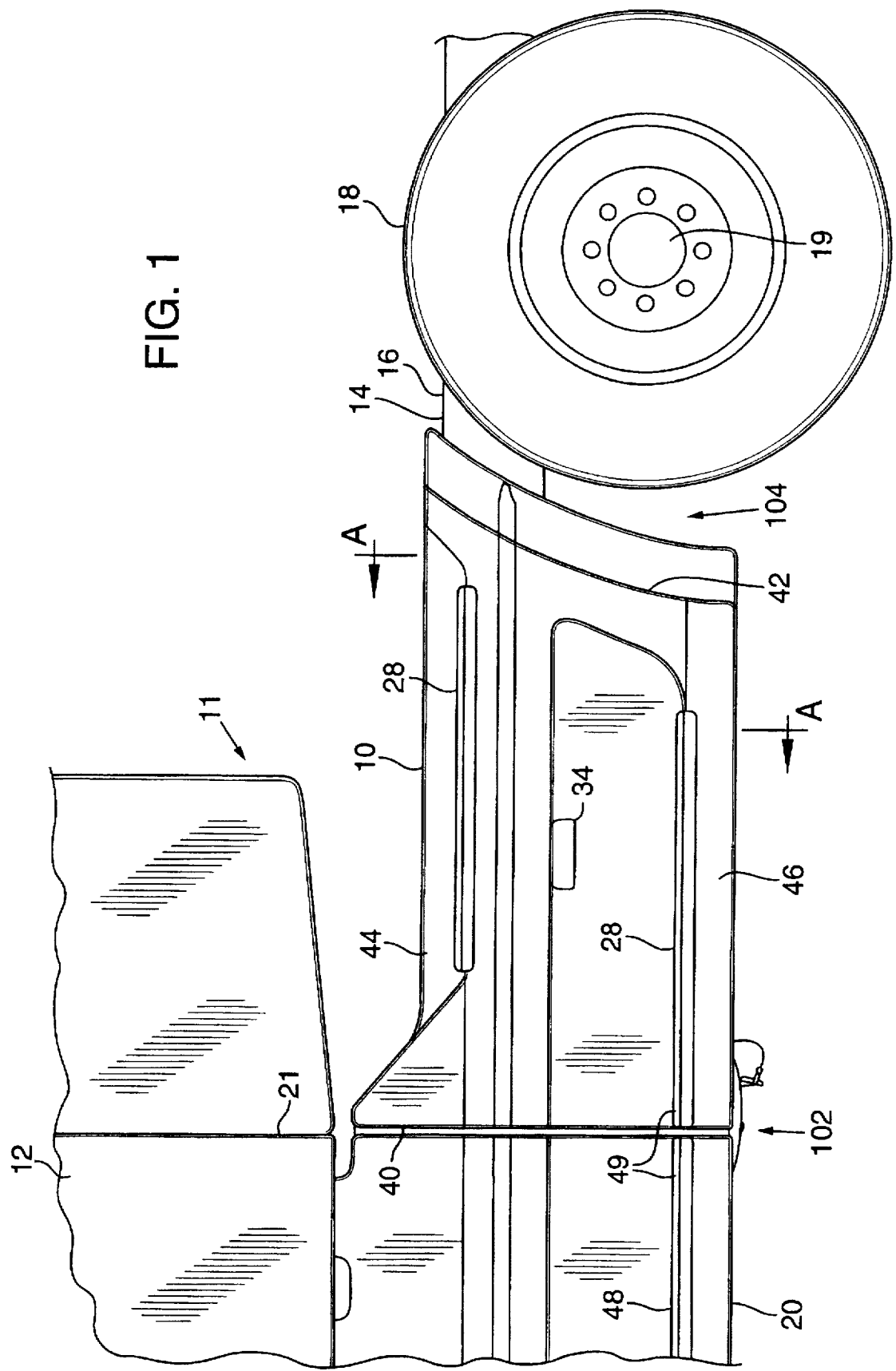
FIG. 1 is a side elevation view of a portion of a vehicle incorporating the present invention.

In FIG. 1 there is shown a preferred embodiment of a removable fairing 10 mounted onto a truck tractor 11 having a cab 12 and a frame 14, including beams or longitudinally extending frame rails 16, that are rotatably supported on wheels 18 (only one wheel is shown in the partial side view). Wheel 18 is coupled to an axle 19 which is positioned behind the rear 21 of the cab with no other axles therebetween. The tractor 11 also includes a fixed fairing 20 located below the cab portion 12. The cab includes an interior compartment in which a vehicle operator sits while operating the vehicle. As is standard, seats and operator controls are located within the interior compartment.

Figure 2:
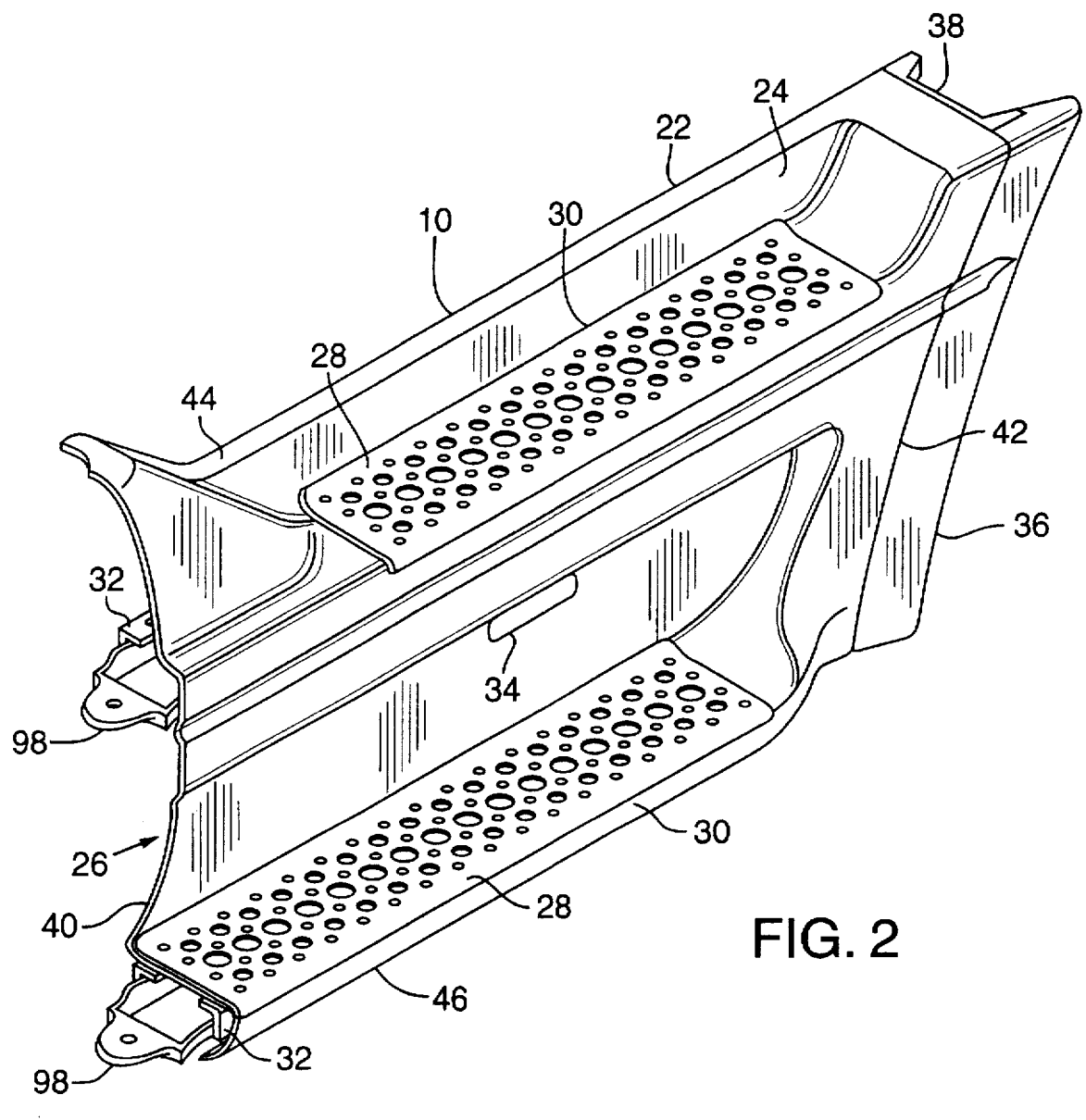
FIG. 2 is a perspective view of a removable fairing of the present invention.

In FIG. 2, it can be seen that the removable fairing 10 comprises a convolute sheet 22 having an outer surface 24 and an inner surface 26. The sheet may be formed from composites, resins, polymers, or other formable material. On the outer surface 24, there are formed substantially flat, level surfaces for use as steps 28. In a preferred embodiment, the steps include abrasive tread plates 30 to provide a slip-resistant surface.

The removable fairing 10 also includes support rails 32 that are located along the inner surface 26 just below the flat surfaces that comprise the steps 28. The rails 32 provide support for weight placed upon the steps and assist the secure attachment of the fairing to the vehicle.

The fairing 10 also includes a recess 34 sized to receive a portion of a hand so that it can be used as a hand grip when lifting and supporting the removable fairing 10. In addition, the fairing 10 may be provided with an end piece 36 that can be easily removed and replaced in the event of damage from loose tire chains or flying debris that may be thrown by the tire 18. Along the top of the end piece 36 where it meets the fairing 10, is a second handhold 38 also for lifting and supporting the removable fairing 10.

For further reference, the fairing 10 shown in FIG. 2 is intended for a left side of a vehicle 11. Although not required, a mirror image fairing may be included at the right side of the vehicle. The depicted fairing 10 has a leading, or forward, margin 40, a trailing, or rear, margin 42, a top margin 44, and a bottom margin 46. The leading margin 40 abuts the contiguous, fixed fairing 20. The trailing margin 42 connects to the end piece 36. The trailing margin is arcuate so that it can fit close to the wheel 18, particularly along its top portion.

Figure 5:
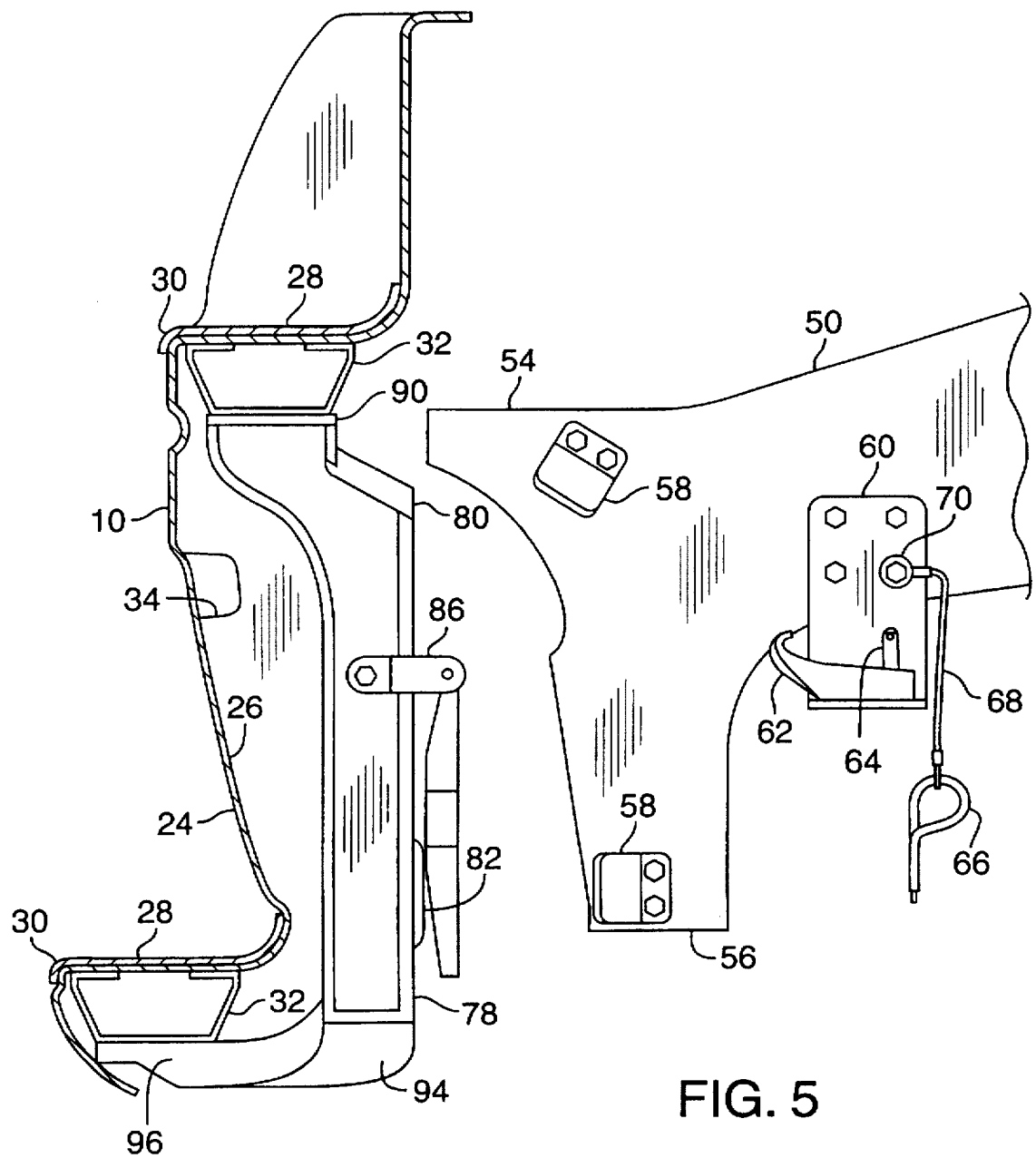
FIG. 5 is a cross-section view taken along line A—A of FIG. 1 showing the removable fairing of the present invention decoupled and separated from the support bracket.
Figure 6:
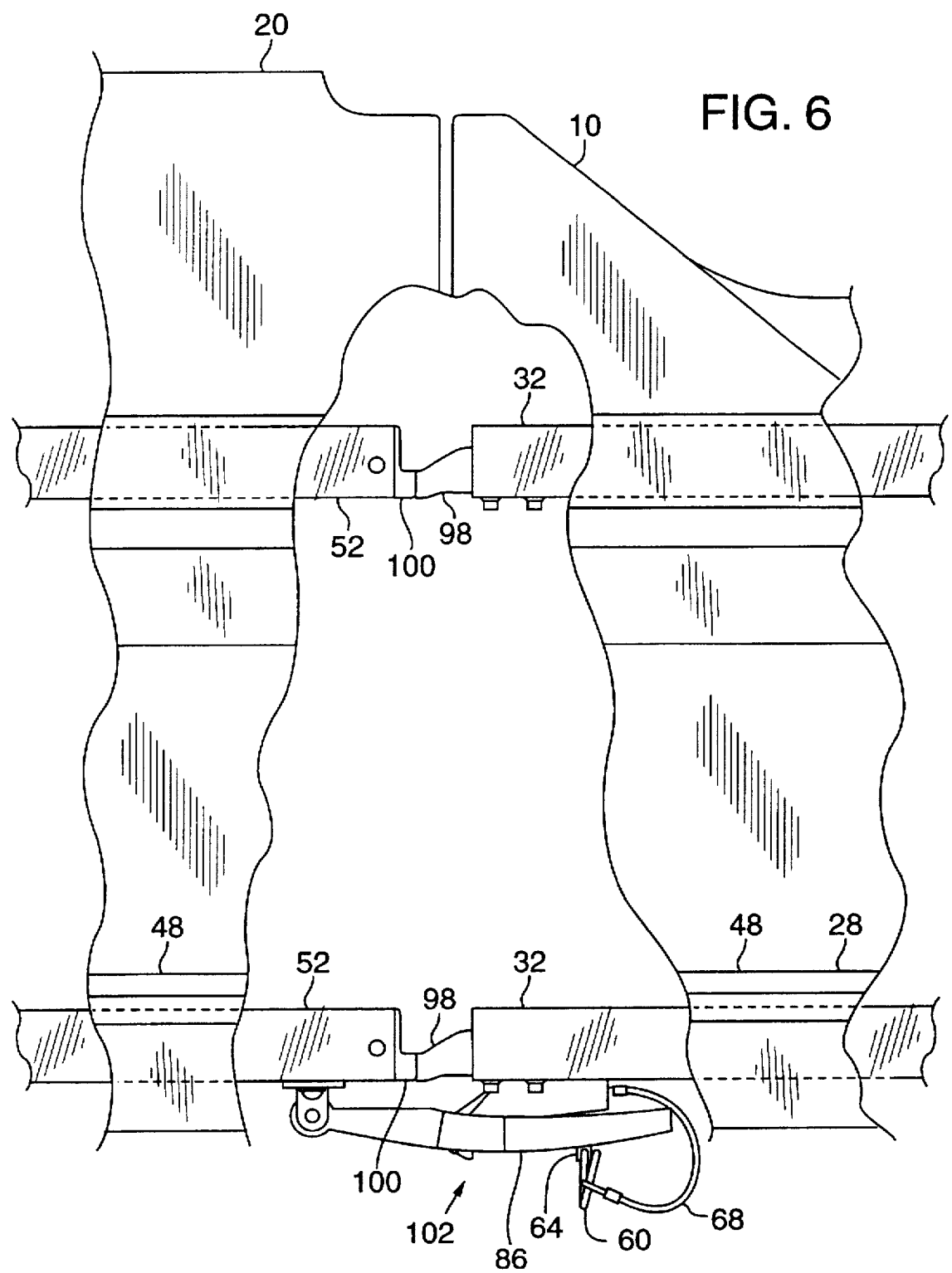
FIG. 6 is a partial, side elevation view broken away to show a connection between the removable fairing of the present invention and a contiguous, fixed fairing.
Figure 7:
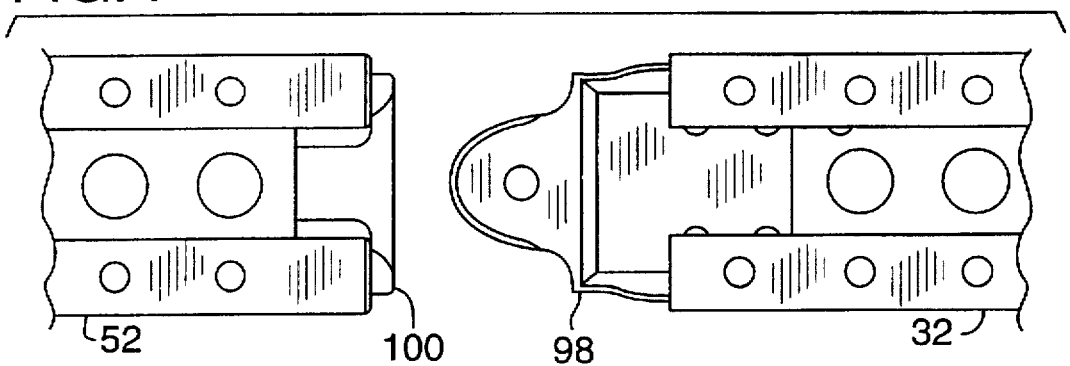
FIG. 7 is a top plan view of a mating connection of rails associated with the removable fairing and the fixed fairing.
Figure 8:
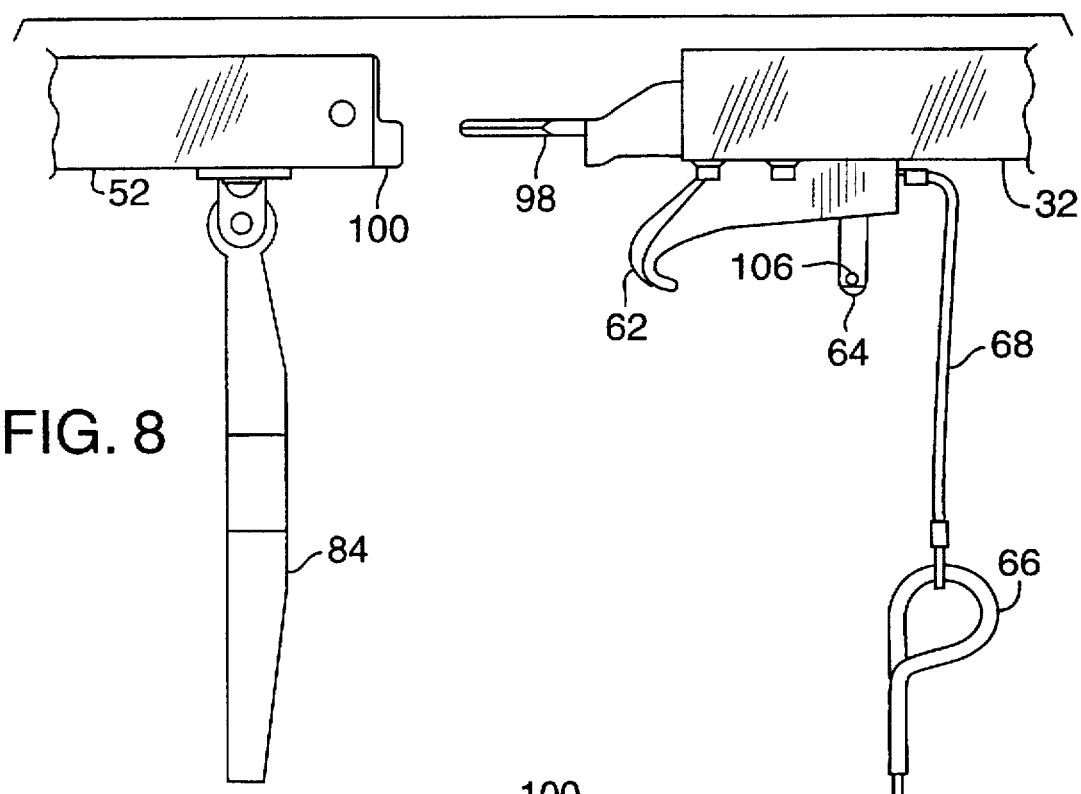
FIG. 8 is a side elevation view of a coupler and fastener associated with rails for the removable fairing and the fixed fairing.

As noted, there are two steps 28. The lower step extends from the leading margin 40 backward toward the trailing margin 42, but terminates several inches forward of the trailing margin. The lower step is located at the leading margin 40 so that it may be contiguous with a step 48 defined on the fixed fairing 20 thereby defining a tread 49 that extends across the removable fairing 10 and fixed fairing 20 (see FIG. 1). The upper step is located part way along the length of the fairing 10 between the leading and trailing margins 40, 42, respectively. shown in FIGS. 3-6, the removable fairing 10 is supported on a support bracket 50 (FIG. 3) and rails 32 (FIG. 6), associated with the fixed fairing 20. The bracket 50 is fixedly connected to the beam 16 of the vehicle frame 14. Bracket 50 extends substantially outward, and preferably is substantially orthogonal or transverse to the longitudinal direction of the beam 16. The support bracket includes a distal platform 54 (FIG. 5) and a depending web 56.

The bracket 50 includes wedge cleats 58 (FIG. 4) and a shelf bracket 60 that supports a hook 62, pin 64 and spring clip 66 which are parts of one form of a suitable latch 76. The spring clip 66 is mounted on a lanyard 68 that is attached to a bolt 70 which secures the shelf bracket 60 to the support bracket 50.

Figure 9:
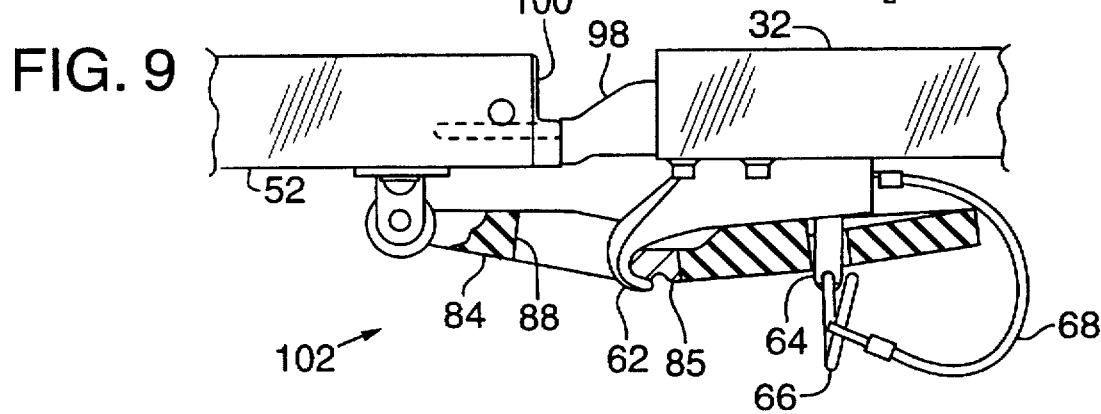
FIG. 9 is a side elevation view showing rails of the removable and fixed fairings coupled together and fastened by the fastener.

The fairing 10 also includes a brace 78 (FIG. 4) that is fixedly coupled to the upper and lower rails 32. The brace includes outward extending flanges 80, 82 that couple to the cleats 58. Also attached to the brace 78 is an elastic strap 84 that is hingedly mounted to an arm 86. The strap 84 includes an opening 88 (FIG. 4) for receiving the hook 62. Additionally, in the preferred embodiment the strap 84 includes a plastic insert 85 (FIG. 9) that is positioned to engage the hook 62 when the strap and hook are coupled. The latch is commercially available from Southco, Inc. of Concordville, Pennsylvania, and is designated the 274 Series, 277 Series, 284 Series, and 287 Series.

Figure 3:
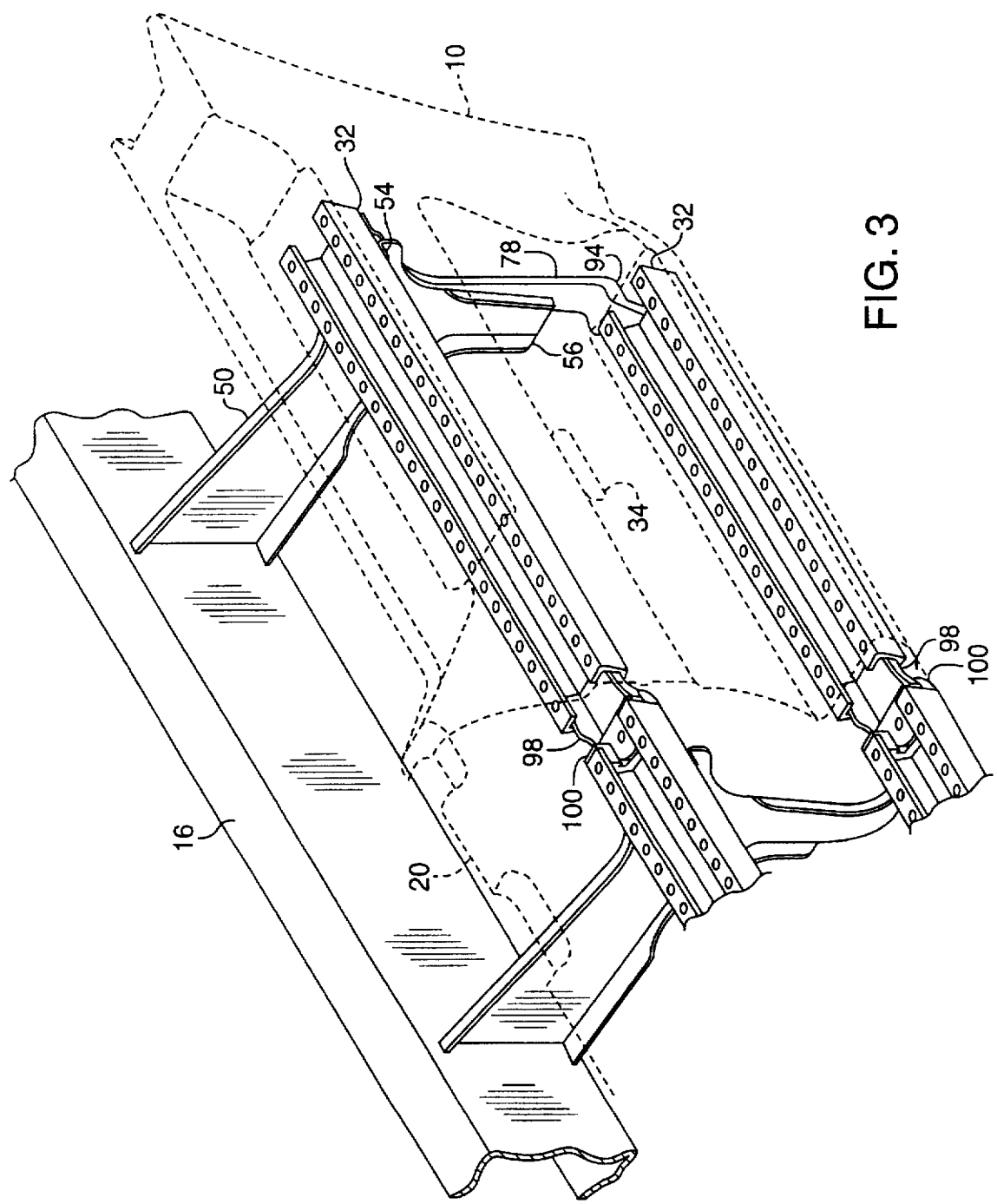
FIG. 3 is a perspective view of the removable fairing and a portion of a fixed fairing wherein the fairings are shown in phantom to reveal supporting structure.
Figure 4:
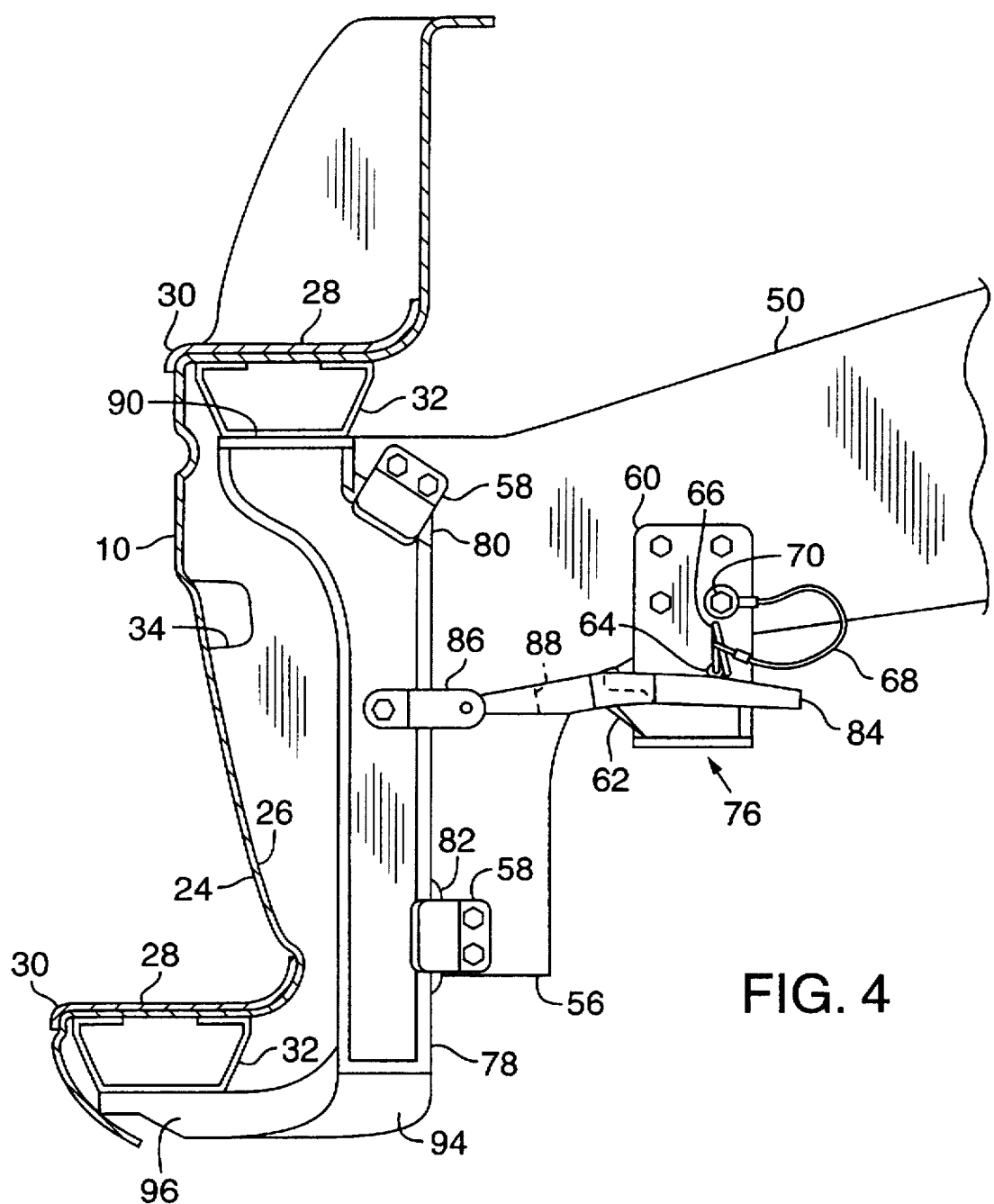
FIG. 4 is a cross-section view taken along line A—A of FIG. 1 showing the removable fairing of the present invention coupled to a support bracket.

The brace 78 (FIG. 4) includes a top portion 90 that is fixedly connected to the upper rail 32 which is supported on bracket platform 54. The bottom rail and lower step are supported, in turn, by the brace 78. As best seen in FIG. 3, the brace 78 includes a dogleg 94 to accommodate the arcuate trailing margin 42 and to provide a lower shelf portion 96 to connect to the lower rail.

Although fairing 10 may be movably connected to the vehicle frame or adjacent components in any suitable manner so as to shift from its operable position shown in FIG. 1 to a second position permitting access to the frame rail 16, in an illustrated preferred form the connection of the removable fairing 10 with the fixed fairing 20 is accomplished by interconnecting their respective rails 32, 52, as shown in FIGS. 6–9. The rails 32 include an extended tenon 98 that is received within a mortise 100 located in the rails 52. Preferably, the mortise and tenon 100, 98, are separately formed components that are slid into the rails 32 and bolted thereto. The mortise 100 is preferably nonmetallic, such as nylon.

In the preferred embodiment, the lower rail set 32, 52 includes a latch 102 that is substantially similar to the latch 76 described above in connection with the support bracket 50. The latch 102 includes the hook 62, pin 64, spring clip 66, and strap 84. Because the strap 86 is elastic, the latch 102 provides a secure, but resilient, means for coupling the rails 32, 52 and retaining the fairing 10 in its installed position.

When the removable fairing is installed on a vehicle as shown in FIG. 1, it may be removed by reaching over the top margin 44 to disconnect the latch 76 and reaching under the bottom margin 46 to disconnect the latch 102 located beneath the border between the fixed and removable fairings 20, 10. After unfastening, the fairing 10 may be grasped at handhold 38 and rotated outward about the mortise and tenon 100, 98 connection. After the rear margin 42 of fairing 10 has been moved outward approximately a foot, the fairing 10 is supported at recess 34 and handhold 38 and pulled rearward. The location of latches 76 and 102 are unobtrusive, but conveniently accessible to an operator standing on a ground surface beside the fairing.

This easy removal makes it easy to access components located on the frame 14, and particularly those components located on the beam or frame rail 16. Further, removing the removable fairing 10 provides easy access to the rear of the cab 12 and the undercarriage (not numbered). It should be noted that this area is one in which there are many components and connections. Thus, easy access to this area substantially eases maintenance operations on the vehicle.

Installation is substantially the reverse process. The tenons 98 are first slid into the mortises 100 and the fairing 10 is rotated into position onto the support bracket 50. Thereafter, straps 84 are grasped at their ends and stretched over hook 62 and pins 64. The spring clips 66 are then inserted through apertures 106 in the pins to retain the straps 84 in position and prevent its inadvertent dislodging.

Numerous characteristics and advantages of the invention have been set forth in the foregoing description, together with details of the structure and function of the invention. The novel features hereof are pointed out in the appended claims. The disclosure is illustrative only, and changes may be made in detail, especially in matters of shape, size, and arrangement of parts within the principle of the invention to the full extent indicated by the broad general meaning of the terms in the claims.

What is claimed:

1. A vehicle, comprising:
    (a) a frame defining an axis that extends between a front and a rear of the vehicle, the frame supported on rotatably mounted wheels;
    (b) a plurality of fairing support brackets fixedly mounted to the frame;

(c) a cab body mounted to the frame; and (d) a side fairing including a fixed portion fixedly attached to at least one support bracket and a removable portion removably attached to at least one support bracket and to the fixed portion, the fixed portion located lower than the cab body and having at least one step for assisting a vehicle operator to access the cab, the step comprising an elongate, substantially horizontal surface longitudinally extending along a direction substantially parallel to the axis, the removable portion located rearwardly of the fixed portion and having at least one step located contiguous with the at least one step of the fixed portion, the removable portion further including at least one latch for coupling the removable portion to the vehicle, whereby the latch can be manually latched and the removable portion separated from the brackets thereby providing access to the frame located behind the cab.

2. A vehicle, comprising:

(a) a frame defining an axis that extends between a front and a rear of the vehicle, the frame supported on rotatably mounted wheels;

(b) a plurality of fairing support brackets fixedly mounted to the frame;

(c) a cab body mounted to the frame; and (d) a side fairing including a fixed portion fixedly attached to at least one support bracket and a removable portion removably attached to at least one support bracket and to the fixed portion, the fixed portion located lower than the cab body and having at least one step for assisting a vehicle operator to access the cab, the step comprising an elongate, substantially horizontal surface longitudinally extending along a direction substantially parallel to the axis, the removable portion located rearwardly of the fixed portion and having at least one step, the removable portion further including at least one latch for coupling the removable portion to the vehicle, whereby the latch can be manually latched and the removable portion separated from the brackets thereby providing access to the frame located behind the cab; and wherein the removable portion of the fairing is a convolute sheet having an inner surface and an outer surface and wherein the at least one step is located along the outer surface and further including at least one rail coupled to the sheet and located along the inner surface below the step to support weight placed on the step and at least one mortis and tenon coupling interconnecting the at least one rail to the fixed portion.

3. The vehicle of claim 2 wherein the removable fairing includes two support rails located on an inner surface of the fairing and a brace interconnecting the rails, and the latch comprises a first part located on the brace and a second part located on at least one of the support brackets wherein the first part couples to the second part to fasten the removable portion onto the at least one of the support brackets.

4. The vehicle of claim 2 wherein the removable portion of the fairing comprises a convolute sheet having an inner surface and an outer surface and two steps located on the outer surface and further comprising at least two support rails mounted to the removable portion of the fairing and located along the inner surface below respective steps to support weight placed on the steps, the support rails being removable with the removable fairing as a unit when the removable fairing is removed.

5. The vehicle of claim 2 wherein the removable portion of the fairing comprises a convolute sheet having an inner surface and an outer surface and two steps located on the outer surface and defined by the outer surface itself and further comprising an upper rail and a lower rail mounted to the fairing and located along the inner surface below the portions of the outer surface defining the respective steps to support weight placed on the steps and further comprising a brace fixedly coupled to both rails for supporting the lower rail when the upper rail is supported by at least one of the plurality of support brackets.

6. The vehicle of claim 2 wherein the plurality of brackets comprises a bracket located proximate a rear margin of the fixed portion and a bracket located proximate a rear margin of the removable portion.

7. The vehicle of claim 2 wherein the at least one latch comprises first and second resilient latches, the first latch located near a trailing edge of the removable portion proximate a wheel and the second latch located proximate the junction of the fixed portion and the removable portion.

8. A vehicle, comprising:

(a) a frame defining an axis that extends between a front and a rear of the vehicle, the frame supported on rotatably mounted wheels;

(b) a plurality of fairing support brackets fixedly mounted to the frame;

(c) a cab body mounted to the frame;

(d) a side fairing including a fixed portion fixedly attached to at least one support bracket and a removable portion removably attached to at least one support bracket and to the fixed portion, the fixed portion located lower than the cab body and having at least one step for assisting a vehicle operator to access the cab, the step comprising an elongate, substantially horizontal surface longitudinally extending along a direction substantially parallel to the axis, the removable portion located rearwardly of the fixed portion and having at least one step located contiguous with the at least one step of the fixed portion, the removable portion further including at least one latch for coupling the removable portion to the vehicle, whereby the latch can be manually latched and the removable portion separated from the brackets thereby providing access to the frame located behind the cab; and wherein the at least one latch comprises an elastic strap and a hook wherein the elastic strap includes an aperture for receiving the hook.

9. A side mounted removable fairing for reducing aerodynamic drag on a vehicle, comprising a convolute sheet having top and bottom margins, and front and rear margins, the sheet also defining an outer surface and an inner surface, on the outer surface is at least one substantially planar surface for providing a step when the fairing is mounted onto a vehicle to assist a vehicle operator to access portions of the vehicle, the outer surface also including a recess sized to accommodate a hand to facilitate gripping and holding the fairing, the fairing further comprising at least one support rail coupled to the sheet along the inner surface and opposed to the substantially planar surface to provide support for the planar surface when the planar surface is used as said step, the at least one rail having a tongue at one end thereof to couple the rail to a contiguously located fixed fairing, the removable fairing further comprising at least one fastener for fastening the removable fairing onto the vehicle.

10. The removable fairing of claim 9 wherein the rear margin is arcuate.

11. The removable fairing of claim 9 including two substantially planar surfaces to provide two steps when the fairing is mounted on a vehicle, one step being below the other step, the lower step extending from the front margin toward the rear margin and the upper step located between the front margin and the rear margin.

12. The removable fairing of claim 9 further comprising a step plate having a slip resistant surface located on the at least one substantially planar surface.

13. The removable fairing of claim 9 including two substantial planar surfaces and two rails located on the inner surface opposed to the substantially planar surfaces and further comprising a brace located proximate the rear margin and fixedly coupled to the two rails for supporting the lower rail.

14. The removable fairing of claim 9 wherein the at least one fastener is a latch comprising an elastic strap and a hook, the elastic strap having an aperture therein for receiving the hook.

15. The removable fairing of claim 9 wherein the at least one fastener comprises an elastic strap, a hook, a pin, and a clip, the elastic strap having a hook aperture for receiving the hook and a pin aperture for receiving the pin wherein the elastic strap engages the hook at the hook aperture and the pin passes through the pin aperture and the clip engages the pin to retain the strap on the hook.

16. The removable fairing of claim 9 wherein the sheet defines four substantially planar surfaces, two of which are located along the outer surface and two of which are located along the inner surface, further comprising two rails fixedly attached to respective substantially planar surfaces on the inner surface to support weight placed on the substantially planar surfaces located on the outer surface.

17. The removable fairing of claim 9 wherein the sheet defines four substantially planar surfaces, two of which are located along the outer surface and two of which are located along the inner surface, further comprising two rails fixedly attached to respective substantially planar surfaces on the inner surface to support weight placed on the substantially planar surfaces located on the outer surface, and a brace fixedly attached to the two rails proximate the rear margin.

18. The fairing of claim 9 wherein the sheet defines four substantially planar surfaces, two of which are located along the outer surface and two of which are located along the inner surface, further comprising two rails fixedly attached to respective substantially planar surfaces on the inner surface to support weight placed on the substantially planar surfaces located on the outer surface, and a brace fixedly attached to the two rails proximate the rear margin, and wherein one fastener is located on the bracket and one fastener is located on one rail proximate the front margin of the fairing.

19. A vehicle comprising:
   (a) an elongated vehicle frame having at least one frame rail extending between a front and a rear of the vehicle;
   (b) a cab supported by the frame;
   (c) wheels rotatably coupled to the frame including wheels supported by a first axle spaced rearwardly of the vehicle cab with no axles between said first axle and a rear of the vehicle cab;
   (d) a side fairing located substantially between the rear of the cab and the first axle;
   (e) spaced apart side fairing supports projecting outwardly from the frame rail and defining a frame rail access space therebetween;
   (f) the side fairing being removably coupled to at least one of the side fairing supports such that when in a first position the side fairing is supported by at least one side fairing support and when in a second position the side fairing does not block access to the access space; and
   (g) and at least one manually actuated resilient latch operable when latched to retain the side fairing in the first position and when released to permit movement of the side fairing to the second position.

20. A vehicle comprising:
   (a) an elongated vehicle frame having at least one frame rail extending between a front and a rear of the vehicle;
   (b) a cab supported by the frame;
   (c) wheels rotatably coupled to the frame including wheels supported by a first axle spaced rearwardly of the vehicle cab with no axles between said first axle and a rear of the vehicle cab;
   (d) a side fairing located substantially between the rear of the cab and the first axle;
   (e) spaced apart side fairing supports projecting outwardly from the frame rail and defining a frame rail access space therebetween;
   (f) the side fairing being movably coupled to at least one of the side fairing supports such that when in a first position the side fairing is supported by at least one side fairing support and when in a second position the side fairing does not block access to the access space;
   (g) and at least one manually actuated latch operable when latched to retain the side fairing in the first position and when released to permit movement of the side fairing to the second position; the vehicle of claim 19 wherein the side fairing is entirely detached from the vehicle when in the second position; and wherein the side fairing is entirely detached from the vehicle when in the second position.

21. A vehicle comprising:
   (a) an elongated vehicle frame having at least one frame rail extending between a front and a rear of the vehicle;
   (b) a cab supported by the frame;
   (c) wheels rotatably coupled to the frame including wheels supported by a first axle spaced rearwardly of the vehicle cab with no axles between said first axle and a rear of the vehicle cab;
   (d) a side fairing located substantially between the rear of the cab and the first axle;
   (e) spaced apart side fairing supports projecting outwardly from the frame rail and defining a frame rail access space therebetween;
   (f) the side fairing being removably coupled to at least one of the side fairing supports such that when in a first position the side fairing is supported by at least one side fairing support and when in a second position the side fairing does not block access to the access space;
   (g) and at least one manually actuated latch operable when latched to retain the side fairing in the first position and when released to permit movement of the side fairing to the second position; and
   in which the side fairing includes first and second elongated reinforcing members extending longitudinally from front to rear of the side fairing, end portions of said first and second reinforcing members being supported by said at least one side fairing support.

22. The vehicle according to claim 21 in which the side fairing includes first and second longitudinally extending steps and in which each of said first and second elongated reinforcing members underlies and reinforces a respective step.

23. A vehicle comprising:
(a) an elongated vehicle frame having at least one frame rail extending between a front and a rear of the vehicle;
(b) a cab supported by the frame;
(c) wheels rotatably coupled to the frame including wheels supported by a first axle spaced rearwardly of the vehicle cab with no axles between said first axle and a rear of the vehicle cab;
(d) a side fairing located substantially between the rear of the cab and the first axle;
(e) spaced apart side fairing supports protecting outwardly from the frame rail and defining a frame rail access space therebetween;
(f) the side fairing being movably coupled to at least one of the side fairing supports such that when in a first position the side fairing is supported by at least one side fairing support and when in a second position the side fairing does not block access to the access space; and
(g) and at least one manually actuated latch operable when latched to retain the side fairing in the first position and when released to permit movement of the side fairing to the second position;
the side fairing includes first and second reinforcing members extending longitudinally from front to rear of the side fairing, end portions of said first and second reinforcing members being supported by said at least one side fairing support; and
in which a first of said side fairing supports is positioned adjacent to one end of the side fairing and a second of said side fairing supports is positioned adjacent to an end of a contiguous fixedly mounted side fairing, the access space being bracing free and extending between the first and second side fairing supports.

24. A vehicle comprising:
(a) an elongated vehicle frame having at least one frame rail extending between a front and a rear of the vehicle;
(b) a cab supported by the frame;
(c) wheels rotatably coupled to the frame including wheels supported by a first axle spaced rearwardly of the vehicle cab with no axles between said first axle and the rear of the vehicle cab;
(d) a side fairing located substantially between the rear of the cab and the first axle, elongated structural rails mounted to the side fairing such that the side fairing and elongated structural rails form a removable unit; and
(e) first and second spaced apart fairing supports projecting outwardly from the frame rail and defining an access space between the first and second supports, the access space having no structural members or fuel tanks positioned therein;
(f) the side fairing and elongated structural rails being detachably coupled to the frame rail and detachably supported by the fairing supports, wherein removal of the fairing and elongated structural rails as a unit provides access to the access space by a vehicle operator located beside the vehicle.

* * * * *